United States Patent
Baltrusch et al.

(10) Patent No.: US 10,889,374 B1
(45) Date of Patent: Jan. 12, 2021

(54) ONBOARD DRONE HUMAN-MACHINE INTERFACE FOR AUTONOMOUS OPERATION

(71) Applicant: SURVICE Engineering Company, Belcamp, MD (US)

(72) Inventors: Robert Eric Baltrusch, Newark, DE (US); Shawn Thomas Recker, Sacramento, CA (US); Mark Thomas Butkiewicz, North Wast, MD (US)

(73) Assignee: SURVICE Engineering Company, Belcamp, MD (US)

( * ) Notice: Subject to any disclaimer, the term of this patent is extended or adjusted under 35 U.S.C. 154(b) by 288 days.

(21) Appl. No.: 15/969,970

(22) Filed: May 3, 2018

Related U.S. Application Data

(60) Provisional application No. 62/500,908, filed on May 3, 2017.

(51) Int. Cl.
*B64C 39/02* (2006.01)
*G05D 1/00* (2006.01)

(52) U.S. Cl.
CPC ......... *B64C 39/024* (2013.01); *G05D 1/0022* (2013.01); *G05D 1/0088* (2013.01); *B64C 2201/024* (2013.01); *B64C 2201/141* (2013.01); *B64C 2201/146* (2013.01)

(58) Field of Classification Search
CPC ............ B64C 39/024; B64C 2201/024; B64C 2201/141; B64C 2201/146; G05D 1/0022; G05D 1/0088
See application file for complete search history.

(56) References Cited

U.S. PATENT DOCUMENTS

| | | | | |
|---|---|---|---|---|
| 5,933,098 | A * | 8/1999 | Haxton | B60R 25/1012 340/430 |
| 6,362,589 | B1 * | 3/2002 | Inoue | G05D 1/0088 318/568.1 |
| 9,471,059 | B1 * | 10/2016 | Wilkins | G05D 1/0016 |
| 9,647,748 | B1 * | 5/2017 | Mitchell | H04B 7/18508 |
| 9,665,098 | B1 * | 5/2017 | Lema | G05D 1/0088 |
| 10,759,045 | B2 * | 9/2020 | Yang | B25J 19/023 |
| 2004/0249519 | A1 * | 12/2004 | Frink | G05D 1/0061 701/3 |
| 2007/0060212 | A1 * | 3/2007 | Shah | H04W 4/12 455/572 |
| 2009/0173561 | A1 * | 7/2009 | Moriguchi | B25J 5/007 180/167 |

(Continued)

*Primary Examiner* — Sze-Hon Kong
(74) *Attorney, Agent, or Firm* — Peter Loffler

(57) ABSTRACT

An autonomous drone system uses an onboard command and control system for controlling operations of a drone without the need for a radio frequency controller or an external electronic device programming unit. The system uses a control unit that interacts with the drone's unmanned aerial system flight controller. The control unit is programmed via an HMI button that is resident onboard the drone. Various sequences of HMI button depressions program the drone for its missions as well as command the drone to perform the missions. A microphone can be substituted for or can augment the HMI button. Various devices, such as a speaker, lights, a visual display screen, etc., can be resident on the drone for giving a user feedback during command and programming of the drone.

7 Claims, 3 Drawing Sheets

(56) References Cited

U.S. PATENT DOCUMENTS

| | | | |
|---|---|---|---|
| 2012/0316679 A1* | 12/2012 | Papaefstathiou | B25J 13/006 700/258 |
| 2015/0142211 A1* | 5/2015 | Shehata | H04W 4/42 701/2 |
| 2015/0203213 A1* | 7/2015 | Levien | H04L 63/14 701/486 |
| 2016/0077822 A1* | 3/2016 | Lu | G06F 8/65 717/168 |
| 2016/0336020 A1* | 11/2016 | Bradlow | B64C 39/024 |
| 2016/0376004 A1* | 12/2016 | Claridge | B64C 27/08 701/3 |
| 2017/0060128 A1* | 3/2017 | Matloff | G05D 1/0016 |
| 2018/0025498 A1* | 1/2018 | Omari | G06K 9/00711 348/144 |
| 2018/0084741 A1* | 3/2018 | Gilliam | B05B 12/004 |
| 2018/0094935 A1* | 4/2018 | O'Brien | G05D 1/102 |
| 2018/0095459 A1* | 4/2018 | Bachrach | B64C 39/00 |
| 2018/0204331 A1* | 7/2018 | Omari | G06T 7/248 |
| 2019/0206152 A1* | 7/2019 | Du | B64F 5/40 |
| 2020/0019189 A1* | 1/2020 | Chen | G08G 5/045 |

\* cited by examiner

ONBOARD DRONE HUMAN-MACHINE INTERFACE FOR AUTONOMOUS OPERATION

This application claims the benefit of U.S. provisional application No. 62/500,908, filed on May 3, 2017, which provisional application is incorporated herein by reference in its entirety.

STATEMENT CONCERNING GOVERNMENT RIGHTS

This invention was made with Government support under Contra. Number W15P7T-10-D-D416, awarded by the United States Army. The Government has certain rights in the invention.

BACKGROUND OF THE INVENTION

1. Field of the Invention

The present invention relates to a drone wherein input commands to the drone are via an appropriate human-machine interface that is resident onboard the drone.

2. Background of the Prior Art

Drones use some form of wireless controller for their operation, wherein the controller communicates with the drone through radio frequency communication in order to define a mission for the drone or otherwise to have real-time direct control of the drone. While effective for drone control, the use of a wireless controller presents certain challenges in that the control system may be difficult to learn to use and may be difficult to control the drone via the wireless controller especially for relatively sophisticated drones and/or drones that are performing a relatively complex mission. Additionally, the wireless controller has relatively limited range within which is can effectively communicate with the drone. Wireless communication can be interfered with or otherwise jammed and can even lead to usurpation of control of the drone which can be especially problematic in a war theater.

To address these problems, drones having autonomous mission capabilities have been proposed. Such drones are paired with an electronic device, such as a laptop, tablet, cellphone or similar item, or a dedicated drone control unit, and the mission is pushed to the drone via the electronic device. While eliminating the need for wireless control of the drone, the user is still required to access the separate electronic device and pair the device to the drone. If the drone interacts with several operators, each remote from one another, this can become quite challenging or even impossible for effective overall mission operation.

What is needed is a drone control system that addresses the above stated shortcoming in the art and eliminates the need for separate control hardware for the drone which hardware is to remote of the drone in operation. Specifically, such a drone control system must be resident onboard the drone so that the limited range of a wireless controller to drone interface is eliminated as is the possibility of interfering or jamming of the communication link between the wireless controller and the drone. Such a drone control system must be completely autonomous, that is, the need for a separate controller external of the drone must be eliminated. Control of the drone via such a system must be relatively simple and straightforward.

SUMMARY OF THE INVENTION

The onboard drone human-machine interface for autonomous operation of the present invention addresses the aforementioned needs in the art. The onboard drone human-machine interface for autonomous operation uses an onboard system that receives inputs and commands for drone operation, eliminating the need for a radio control of the drone or the use of an external electronic device that must be linked to the drone for command and control of the drone. By being resident on the drone, the onboard drone human-machine interface for autonomous operations eliminates the possibility of the drone being jammed or otherwise interfered with during operation so as to secure the mission that the drone is executing. The onboard drone human-machine interface for autonomous operation is also easy to learn and quick and easy to use.

The onboard drone human-machine interface for autonomous operation of the present invention is comprised of the following elements: A drone; An unmanned aerial system flight controller resident on the drone for controlling flight operations of the drone; A programmable onboard control unit that is in signal communication with the unmanned aerial flight controller and that sends flight commands to the unmanned aerial flight control unit; An input device is resident on the drone and is in signal communication with the onboard control unit and is used for programming and commanding the onboard control unit; The input device is a push button, a microphone for input via voice command, or both; A feedback device, such as a speaker, a visual display screen, one or more lights, etc., is also resident on the drone and provides feedback when programming the onboard control unit via the input device.

The onboard drone human-machine interface for autonomous operation may also have an antenna onboard that is coupled to the unmanned aerial system flight controller so that an RF controller can be used to send out command and control signals via radio frequencies to the unmanned aerial flight control unit, via the antenna, in order to command and control the unmanned aerial system flight control. Alternately, the onboard drone human-machine interface for autonomous operation can be antenna free, relying strictly on the onboard drone human-machine interface for autonomous operation for its command and control.

DESCRIPTION OF THE PREFERRED EMBODIMENT

Figure 1:
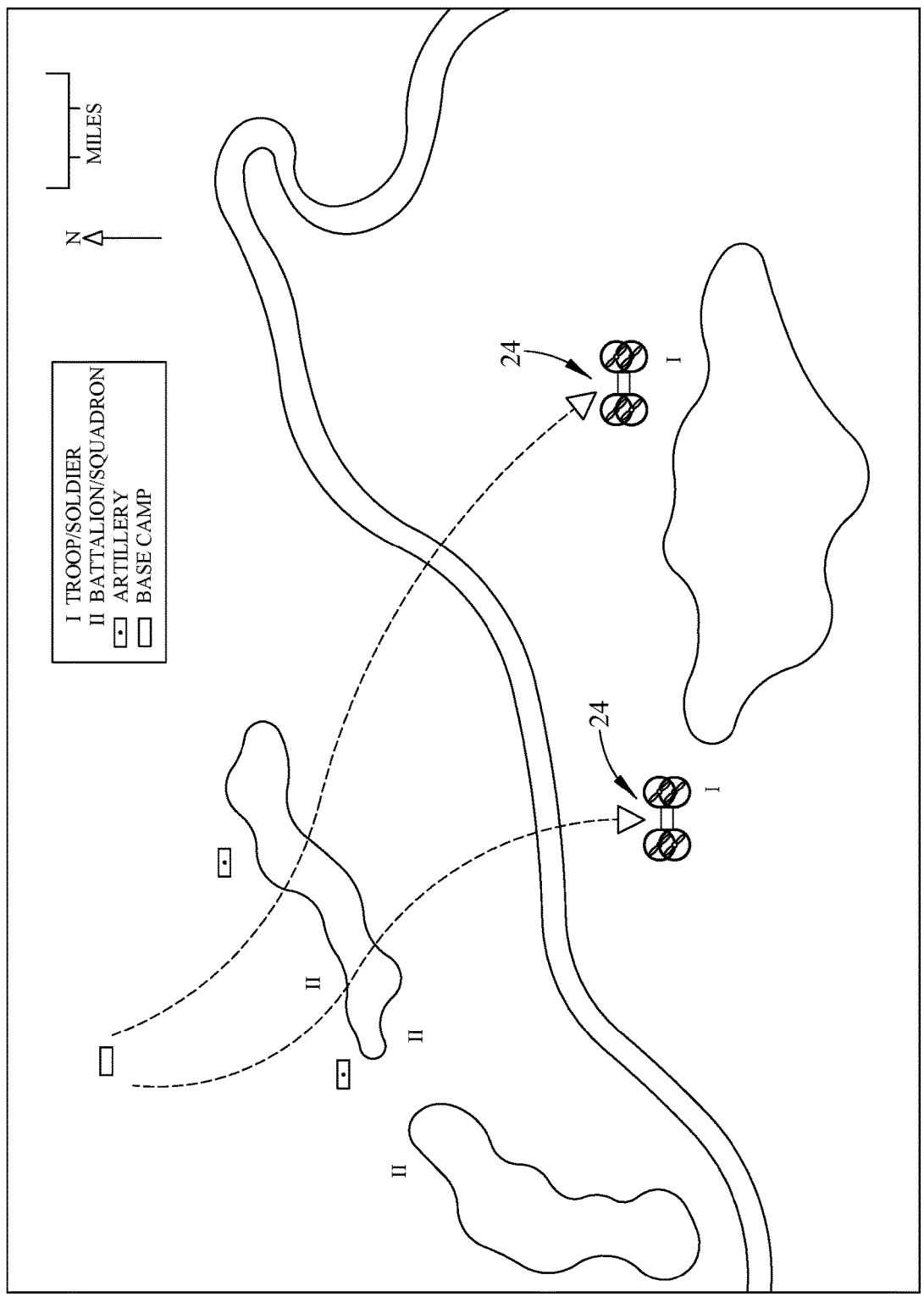
FIG. 1 is map view of the onboard drone human-machine interface for autonomous operation of the present invention illustrating an example of a three waypoint mission that can be achieved by the onboard drone human-machine interface for autonomous operation wherein a drone can fly between any of the three waypoints in any direction.
Figure 2:
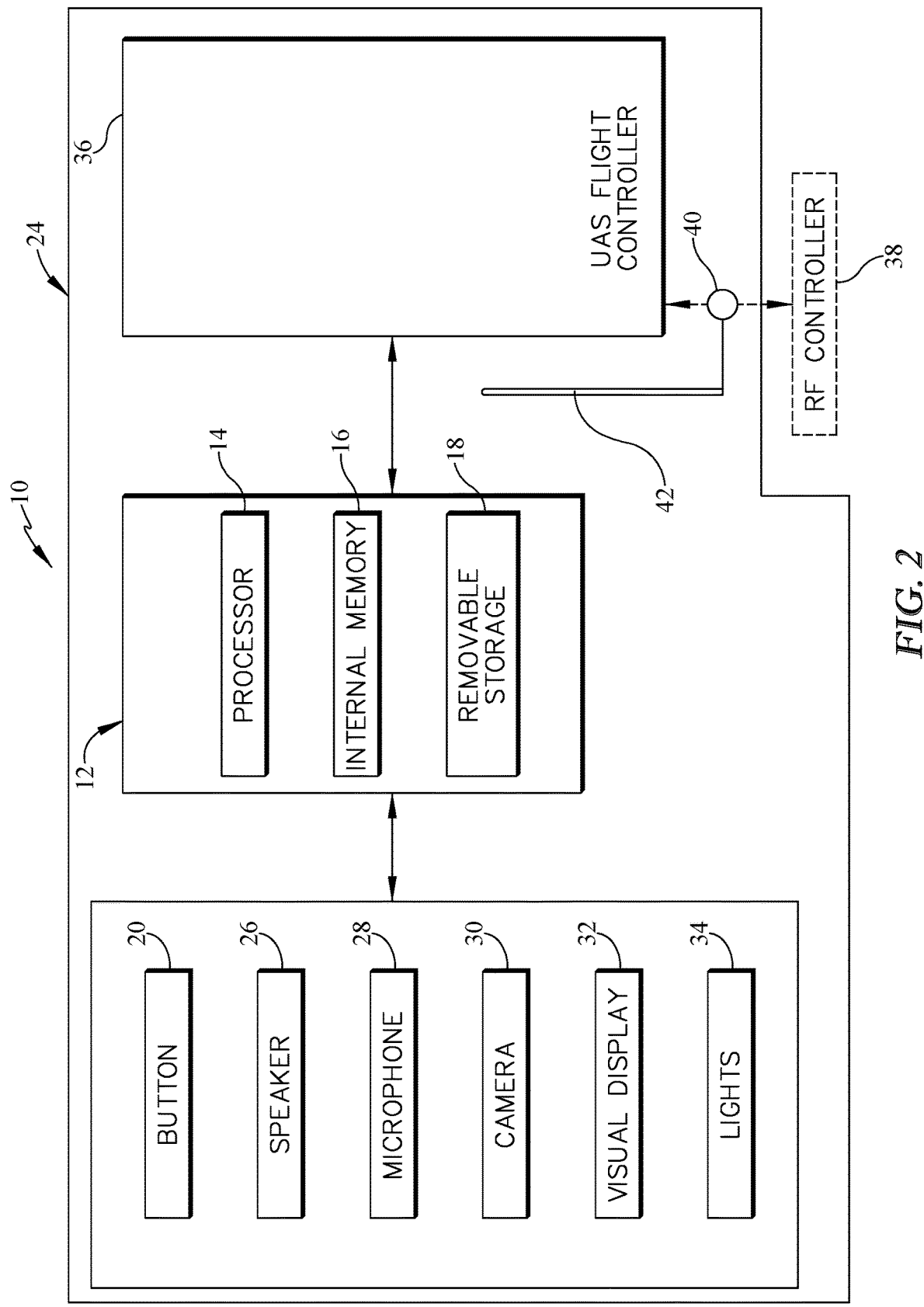
FIG. 2 is a schematic diagram of the control system of the onboard drone human-machine interface for autonomous operation.
Figure 3:
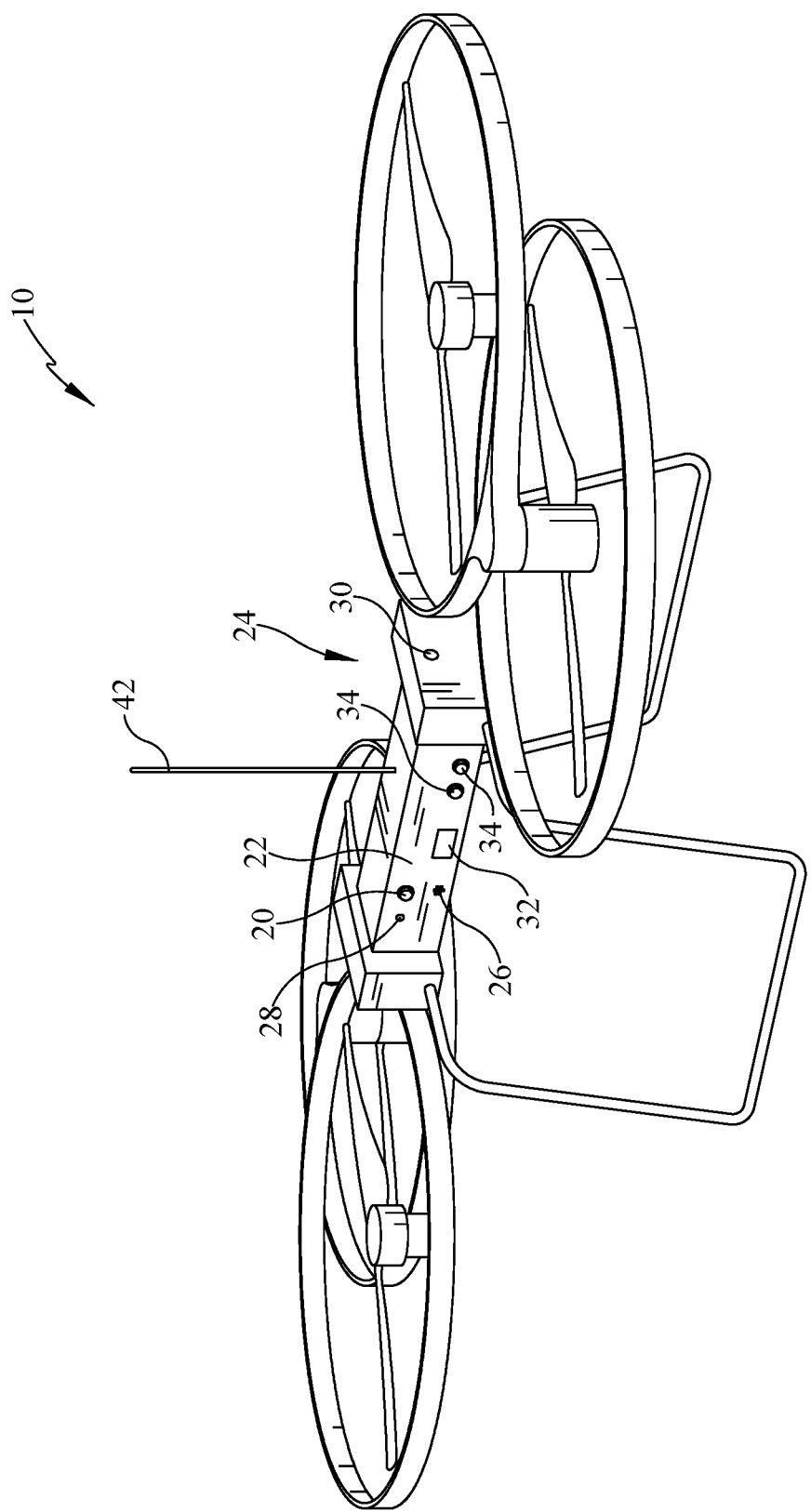
FIG. 3 is a perspective view of the drone used by the onboard drone human-machine interface for autonomous operation, Similar reference numerals refer to similar parts throughout the several views of the drawings.

Referring now to the drawings, it is seen that the onboard drone human-machine interface for autonomous operation of the present invention, generally denoted by reference numeral 10, is comprised of an onboard control unit 12 that is basically a computer and has a processor 14, internal memory 16, and storage 18, which may be removable, and the various other hardware and firmware components that are typical of a computer. The onboard control unit 12 is linked to human-machine interface hardware, specifically at least an HMI button 20, namely a push button 20 (to include equivalents such as a toggle switch, slide switch, etc.,), which may be surface mounted on the outer surface 22 of the drone 24, but which may also be located within an internal pocket within the drone, accessible via an appropriate access panel (neither illustrated) on the outer surface of the drone. In its simplest form, the onboard drone human-machine interface for autonomous operation 10 uses the HMI button 20 for its entire command and control, however, other human machine interface hardware may be included including a speaker 26, a microphone 28, a camera 30, a visual display screen 32, one or more lights 34, etc. The onboard control unit 12 is also linked to an Unmanned Aerial System Flight Controller 36 which controls flight operations of the drone 24 in the typical way.

As seen, the Unmanned Aerial System Flight Controller 36 of the drone 24 may, but need not be connected to a standard Radio Frequency Controller 38 in the usual way. As further seen, a disconnect switch 40, acting as a circuit breaker may be located on the drone 24 between the antenna 42 of the drone 24 and the Unmanned Aerial System Flight Controller 36 in order to act as a circuit breaker and thereby physically disconnect communication between the Radio Frequency Controller 38 and the Unmanned Aerial System Flight Controller 36 so that the drone 24 cannot be jammed or otherwise interfered with during flight. The disconnect switch 40 is located on the drone 24 so that throwing of the switch disconnects the antenna 42 of the drone 24 and the Unmanned Aerial System Flight Controller 36. It may be possible to throw this switch via the Radio Frequency Controller 38.

In operation, the mission of the drone 24 is defined via the HMI button 20 via one or more depressions of the HMI button 20 and once set, the drone 24 is controlled via the HMI button 20, again via one or more depressions of the HMI button 20. For example, a user may be located at a first waypoint. The user depresses the HMI button 20 for a "long" depression, say on the order of two to three seconds, thereby entering the location of the first waypoint. The user then goes to a second waypoint and thereat depresses the HMI button 20 for two long depressions, setting this second waypoint. The user, from either this second waypoint or elsewhere, can command the drone 24 to flight to the first waypoint by depressing the HMI button 20 for one "short" depression, say a fractional second depression. The drone 24 then flies back to the first waypoint as previously programmed into the drone 24. At the first waypoint, a user can command the drone 24 to fly to the second waypoint by depressing the HMI button 20 for two short depressions. The drone then flies to the second waypoint as previously programmed into the drone 24. If the drone 24 is located at a third waypoint, a user can enter the third waypoint by three long depressions of the HMI button 20. If the drone 24 is at the third waypoint and a user wants to send the drone 24 to the first waypoint, the HMI button 20 is depressed for one short depression and if this user wants to send the drone 24 to the second waypoint, the HMI button 20 is depressed for two short depressions, etc. The drone 24 need not be at a previously programmed waypoint to fly to a stored waypoint. Appropriate sequences of HMI button 20 depressions toggle the system between either being in programming mode or command mode.

The above is an example of a programming scheme, of course, other programming schemes can be used to command and control the drone 24. All programming, including storing of the waypoint locations is via the onboard control unit 12.

Alternately, or in addition to the HMI button 20, the drone 24 can be commanded and controlled via the microphone 28 via voice commands. For example, a user may instruct the drone 24 to store a waypoint location, by saying "set waypoint location one" or may instruct the drone 24 to "fly to waypoint two," etc.

The speaker 26, and/or visual display screen 32, and/or the lights 34 are used to give feedback to the user as well as the status of the drone 24.

If the drone 24 can be operated by Radio Frequency Controller 38, then a user, who may be in a combat zone having antagonistic RF jamming, can physically disconnect the ability of the drone 24 from being able to be controlled via radio frequency control by depressing the disconnect switch 40 so as to physically disconnect the onboard antenna 42 of the drone 24 from the Unmanned Aerial System Flight Controller 36 of the drone 24. If a user is controlling the drone 24 via the radio frequency controller 38 and realizes that the drone 24 is being attacked by antagonistic RF signals, the user can, via the Radio Frequency Controller 38, send a command to the drone 24 to trip the disconnect switch 40 so as to disconnect the antenna 42 from the unmanned aerial system flight controller 36 of the drone 24, so that the drone 24 operates only under the command of the onboard drone human-machine interface for autonomous operation 10. If such a command is given, the drone 24 continues on its last commanded decision input via the onboard drone human-machine interface for autonomous operation 10, or if no mission was input, to execute an appropriate reset operation, such as returning to the first set waypoint.

While the invention has been particularly shown and described with reference to an embodiment thereof, it will be appreciated by those skilled in the art that various changes in form and detail may be made without departing from the spirit and scope of the invention.

We claim:

1. An autonomous drone system comprising:
  a drone;
  an unmanned aerial system flight controller resident on the drone for controlling flight operations of the drone;
  a programmable onboard control unit, in signal communication with the unmanned aerial system flight controller, for sending flight commands to the unmanned aerial flight controller;
  an input device, resident on the drone, in signal communication with the onboard control unit, for programming and commanding the onboard control unit such that the input device inputs a program for a flight path between a first waypoint and a second waypoint for the drone into the onboard control unit which in turn sends flight commands to the unmanned aerial system flight controller based on the programming; and
  a circuit breaker, resident on the drone, such that when the circuit breaker is tripped, the antenna is physically disconnected from the unmanned aerial flight control unit so that when the circuit break is tripped, the drone automatically flies to either the first waypoint or the second waypoint.

2. The autonomous drone system as in claim 1 wherein the input device is a push button.

3. The autonomous drone system as in claim 1 wherein the input device is a microphone.

4. The autonomous drone system as in claim 1 wherein the input device is either a push button or a microphone.

5. The autonomous drone system as in claim 1 further comprising a feedback device for providing either audio or visual feedback when programming the onboard control unit via the input device.

6. The autonomous drone system as in claim 1 further comprising:
- an antenna coupled to the unmanned aerial system flight controller;
- an RF controller that sends out command and control signals via radio frequencies to the unmanned aerial flight controller, via the antenna, in order to command and control the unmanned aerial system flight control.

7. The autonomous drone system as in claim 6 wherein the RF controllers sends a trip signal via radio frequencies to the unmanned aerial flight control unit, via the antenna, in order to trip the circuit breaker.

\* \* \* \* \*